US007961079B2

(12) United States Patent
Suzuki (10) Patent No.: US 7,961,079 B2
(45) Date of Patent: Jun. 14, 2011

(54) RADIO COMMUNICATION APPARATUS

(75) Inventor: Shigeaki Suzuki, Izu (JP)

(73) Assignee: Toshiba Tec Kabushiki Kaisha (JP)

( * ) Notice: Subject to any disclaimer, the term of this patent is extended or adjusted under 35 U.S.C. 154(b) by 949 days.

(21) Appl. No.: 11/895,819

(22) Filed: Aug. 28, 2007

(65) Prior Publication Data
US 2008/0061946 A1  Mar. 13, 2008

(30) Foreign Application Priority Data

Sep. 12, 2006  (JP) ................................. 2006-247000
Aug. 7, 2007  (JP) ................................. 2007-205029

(51) Int. Cl.
*H04Q 5/22* (2006.01)

(52) U.S. Cl. ................... 340/10.51; 340/10.1; 340/10.4; 340/572.1

(58) Field of Classification Search ................. 340/10.1, 340/10.4, 10.51, 572.1
See application file for complete search history.

(56) References Cited

U.S. PATENT DOCUMENTS

| 5,394,399 | A * | 2/1995 | Kawasaki et al. | 370/545 |
| 5,619,676 | A * | 4/1997 | Fukuda et al. | 711/137 |
| 7,539,030 | B2 * | 5/2009 | Stewart | 365/49.1 |
| 2003/0097586 | A1 * | 5/2003 | Mok | 713/200 |
| 2004/0128281 | A1 * | 7/2004 | Terazono et al. | 707/1 |
| 2005/0057368 | A1 * | 3/2005 | Corbett et al. | 340/825.49 |
| 2005/0114718 | A1 * | 5/2005 | Ito | 713/300 |
| 2005/0288818 | A1 * | 12/2005 | Ohbayashi | 700/226 |
| 2006/0006987 | A1 * | 1/2006 | Hashimoto et al. | 340/10.51 |
| 2007/0188328 | A1 * | 8/2007 | Mochizuki et al. | 340/572.7 |

FOREIGN PATENT DOCUMENTS

| JP | 2003-150914 | 5/2003 |
| JP | 2005-100170 | 4/2005 |

OTHER PUBLICATIONS

English translation of Office Communication for JP2007-205029 dated Aug. 19, 2008.

* cited by examiner

*Primary Examiner* — George A Bugg
*Assistant Examiner* — Paul Obiniyi
(74) *Attorney, Agent, or Firm* — Harness, Dickey & Pierce, P.L.C.

(57) ABSTRACT

Upon receiving a command for writing data to a transponder, a reading unit performs radio communication with the transponder to which data should be written, thereby reading, in non-contact fashion, a data item stored in the transponder. A collating unit collates the data read by the reading unit with a data item to be written to the transponder. A control unit performs radio communication with the transponder, thereby writing the data item to the transponder, when the data items are not identical, and skips the writing of the data item when the data items are identical.

12 Claims, 7 Drawing Sheets

| n | WID(n) | RID(n) | F(n) |
|---|--------|--------|------|
| 1 | 0006 | 0006 | 1 |
| 2 | 0001 | 0000 | 0 |
| 3 | 0002 | 0000 | 0 |
| 4 | 0003 | 0000 | 0 |
| 5 | 0004 | 0000 | 0 |
| 6 | 0005 | 0000 | 0 |
| 7 | 0006 | 0000 | 0 |

RADIO COMMUNICATION APPARATUS

CROSS-REFERENCE TO RELATED APPLICATIONS

This application is based upon and claims the benefit of priority from prior Japanese Patent Applications No. 2006-247000, filed Sep. 12, 2006; and No. 2007-205029, filed Aug. 7, 2007, the entire contents of both of which are incorporated herein by reference.

BACKGROUND OF THE INVENTION

1. Field of the Invention

The present invention relates to a radio communication apparatus configured to perform radio communication with radio-frequency identification (RFID) transponders or the like.

2. Description of the Related Art

In recent years, much attention has been paid to transponders from and to which data can be read and written by radio. Each transponder stores an ID specific to it. The transponder may be attached to an article, enabling the article to be identified in non-contact fashion. The transponder is generally called an RFID tag, RF tag, radio tag or the like. A radio communication apparatus that accomplishes radio communication with the transponder is called a reader-writer, an interrogator or the like.

Jpn. Pat. Appln. KOKAI Publication No. 2003-150914 discloses a radio communication apparatus that comprises an antenna and a transponder-supplying mechanism. The transponder-supplying mechanism supplies transponders, one after another, to a region to which a radio signal can propagate. The antenna emits and picks up radio signals to and from the transponders. Thus, the radio communication apparatus can read data stored in each transponder. The radio communication apparatus can also write data to each transponder.

The conventional transponder can store data, word by word. One word is two-byte data. Hence, the process of writing data must be repeated seven times in order to store 14-byte data in the transponder. If errors occur while the data is being written to the transponder, the radio communication apparatus needs to perform the data writing again, from the first step thereof. That is, the apparatus must start the data writing again, with the step of detecting the transponder.

Writing errors are liable to occur in any type of radio communication apparatus that writes data to transponders that are moving, like the radio apparatus disclosed in the above-identified publication. This is because the distance between the antenna of the apparatus and the transponder changes from time to time. Once a writing error has been made, the radio communication apparatus starts the data-writing process again. Inevitably, the radio communication apparatus of this type has low process efficiency.

BRIEF SUMMARY OF THE INVENTION

An object of the present invention is to provide a radio communication apparatus that can write data to transponders at high process efficiency.

In an embodiment of this invention, on receiving a command for writing data to a transponder, the reading unit performs radio communication with the transponder to which data should be written, thereby reading, in non-contact fashion, a data item stored in the transponder. The collating unit collates the data read by the reading unit with a data item to be written to the transponder. If the data items are not identical, the control unit performs radio communication with the transponder, thereby writing the data item to the transponder. If the data items are identical, the control unit skips the writing of the data item.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments according to the best mode for carrying out the present invention will be described, with reference to the accompanying drawings. The transponder used in any embodiment will be referred to as an RFID device, and the radio communication apparatus according to any embodiment will be referred to as reader-writer.

First Embodiment

Figure 1:
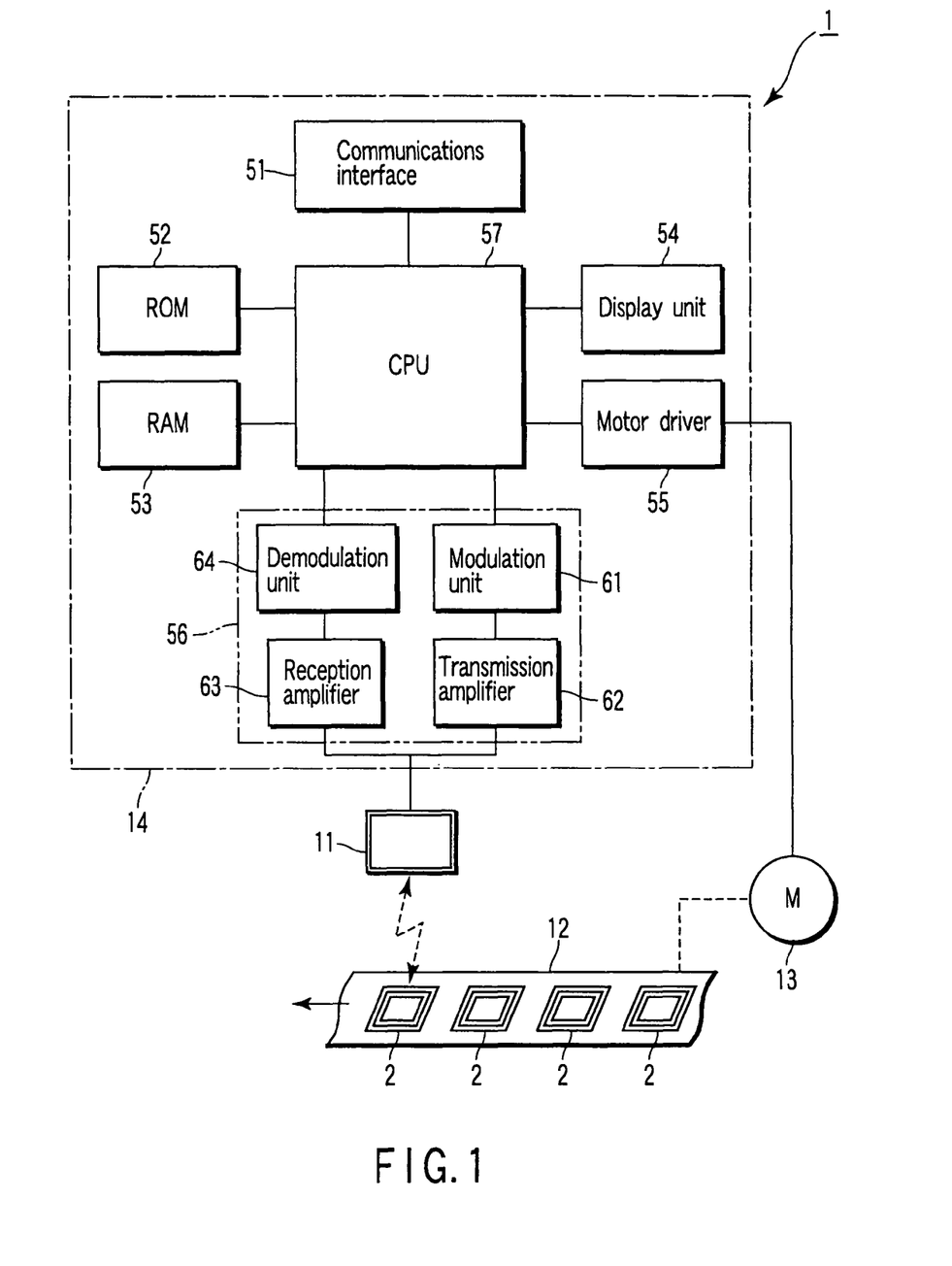
FIG. 1 is a block diagram showing the configuration of a reader-writer according to a first embodiment of this invention.

FIG. 1 is a block diagram showing a reader-writer 1. The reader-writer 1 comprises an antenna 11, a transponder-supplying mechanism 12, a motor 13, and a reader-writer unit 14. The transponder-supplying unit 12 supplies RFID devices 2, one after another, to a region to which a radio signal can propagate. The motor 13 is a driver that drives the transponder-supplying mechanism 12.

The reader-writer unit 14 comprises a communication interface 51, a ROM 52, a RAM 53, a display unit 54, a motor driver 55, a digital modem circuit 56, and a CPU 57. The CPU 57 controls the communication interface 51, ROM 52, RAM 53, display unit 54, motor driver 55 and digital modem circuit 56.

The communication interface 51 controls the data transfer between the reader-writer unit 14 and a host apparatus such as a personal computer. The ROM 52 stores fixed data such as programs. The RAM 53 has a plurality of memory areas. In these memory areas, variable data is temporarily stored. The display unit 54 displays errors, if any. The motor driver 55 drives the motor 13.

The digital modem circuit 56 is connected to the antenna 11. The digital modem circuit 56 comprises a modulation unit 61 a transmission amplifier 62, a reception amplifier 63, and a demodulation unit 64.

The modulation unit 61 modulates a carrier signal with the sending digital data supplied from the CPU 57. The transmission amplifier 62 amplifies the modulated signal output from the modulation unit 61. The modulated signal amplified is supplied to the antenna 11.

The reception amplifier 63 amplifies the modulated signal the antenna 11 has picked up. The demodulation unit 64 demodulates the digital received data from the modulated signal amplified by the reception amplifier 63. The data thus demodulated is supplied to the CPU 57.

Figure 2:
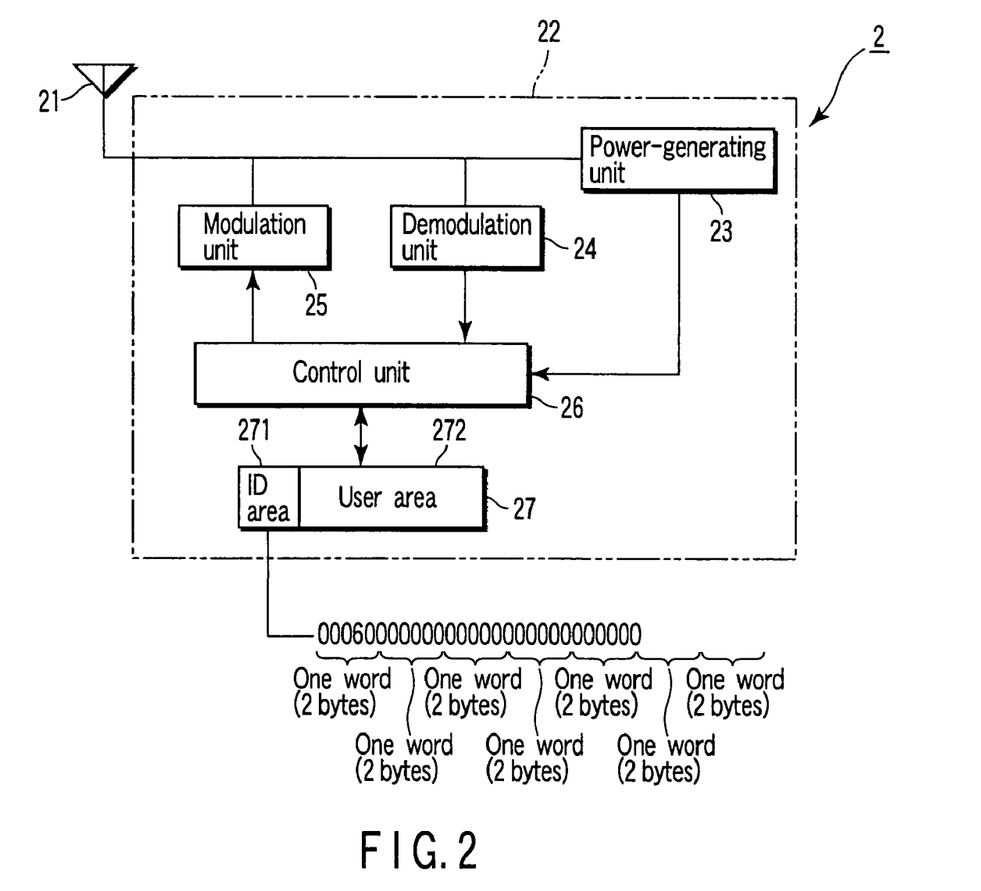
FIG. 2 is a block diagram showing the configuration of a transponder used in the first embodiment.

FIG. 2 is a block diagram showing the configuration of one of the RFID devices that are identical in configuration. The RFID device 2 comprises an antenna 21 and an IC chip 22. The IC chip 22 contains a power-generating unit 23, a demodulation unit 24, a modulation unit 25, a control unit 26, and a memory unit 27. The control unit 26 controls the other components of the IC chip 22.

The power-generating unit 23 rectifies and stabilizes the modulated signal picked up by the antenna 21, thereby generating a power-supply voltage. The power-supply voltage generated by the power-generating unit 23 is applied to the components provided in the IC chip 22. The demodulation unit 24 demodulates the modulated signal picked up by the antenna 21. The demodulated data is supplied to the control unit 26. The modulation unit 25 modulates the data supplied from the control unit 26. The data modulated is supplied to the antenna 21. The control unit 26 writes the data demodulated by the demodulation unit 24 to the memory unit 27. The control unit 26 also reads the data from the memory unit 27 and supplies this data to the modulation unit 25.

The memory unit 27 has an ID area 271 and a user area 272. In the ID area 271, IDs that identify the respective RFID devices 2 are stored. In the user area 272, any data desired can be written.

In the first embodiment, the data block that can be written to the RFID device 2 at a time is one word. One word is two-byte data (i.e., 16-bit data). As shown in FIG. 2, the ID of the RFID device 2 is 14-byte data (i.e., seven words). To write the ID to the RFID device 2, the reader-writer 1 must repeat the writing process, basically seven times.

The first word of the ID represents the number of the remaining words. The remaining words of the ID represent the code specific to the RFID device. In the first embodiment, the ID consists of seven words. The first word of the ID is therefore fixed two-byte data, or "0006" that represents the number of words (i.e., "6").

A common ID, "00060000000000000000000000000000" is stored in each RFID device 2. When an RFID device 2 is moved by the transponder-supplying unit 12 to the region to which a radio signal can propagate from the antenna 11, its ID is rewritten into the data specific to the RFID device 2, i.e., "0006xxxxxxxxxxxxxxxxxxxxxxxxxx" (each x is any given value). How such an ID is rewritten will be explained in detail.

Figure 3:
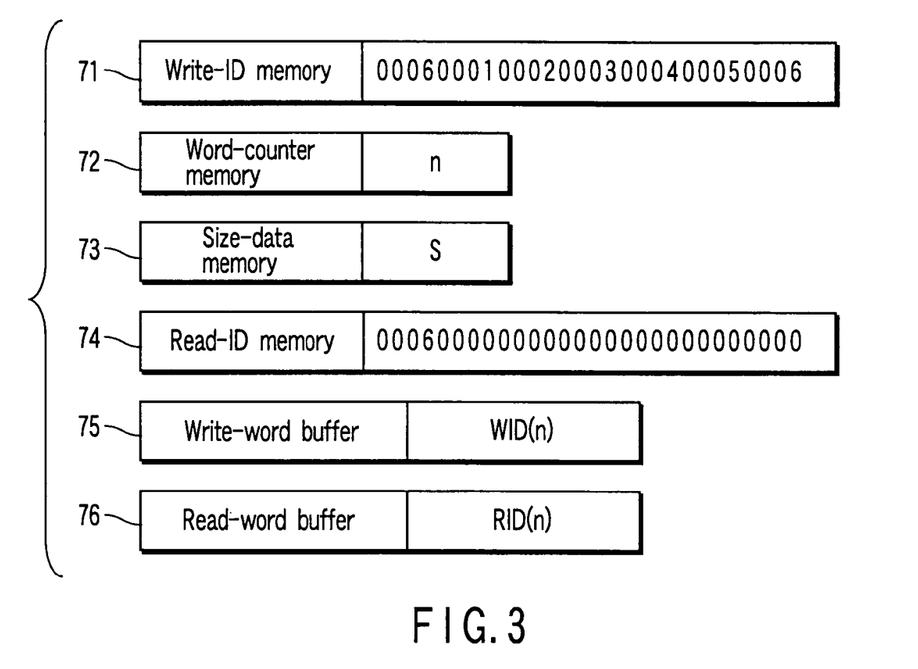
FIG. 3 is a diagram showing the main memory area of the RAM provided in the reader-writer according to the first embodiment.

As shown in FIG. 3, the RAM 53 of the reader-writer unit 14 has a write-ID memory 71, a word-counter memory 72, a size-data memory 73, a read-ID memory 74, a write-word buffer 75, and a read-word buffer 76.

Figure 4:
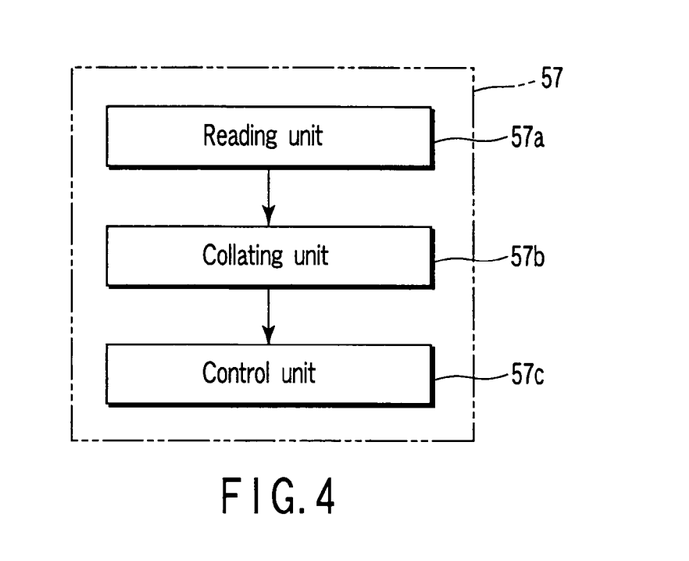
FIG. 4 is a block diagram showing the major functions of the CPU provided in the reader-writer according to the first embodiment.

As shown in FIG. 4, the CPU 57 of the reader-writer unit 14 can function as a reading unit 57a, a collating unit 57b, and a control unit 57c. The reading unit 57a operates in accordance with an ID-write command for the RFID device 2. The ID-write command contains an ID (hereinafter referred to as write ID) instructing that data should be written to the RFID device 2.

The reading unit 57a performs radio communication with the RFID device 2 to which data should be written, thereby reading the ID stored in the memory unit 27 of this RFID device 2. The collating unit 57b collates the ID read by the reading unit 57a with the write ID. The control unit 57c receives the result of collation performed by the collating unit 57b. If the ID is not identical to the write ID, the control unit 57c performs radio communication with the RFID device 2 to which data should be written, thereby writing the ID in non-contact fashion. If the ID is identical to the write ID, the control unit 57c does not write the ID at all.

These functions of the CPU 57 are implemented in accordance with an ID-writing program. The ID-writing program is stored in, for example, the ROM 52.

On receiving an ID-write command from the host apparatus via the communication interface 51, the CPU 57 activates the ID-writing control program. Once having activated this program, the CPU 57 performs the ID-rewriting process in the sequence shown in the flowchart of FIG. 5.

Figure 5:
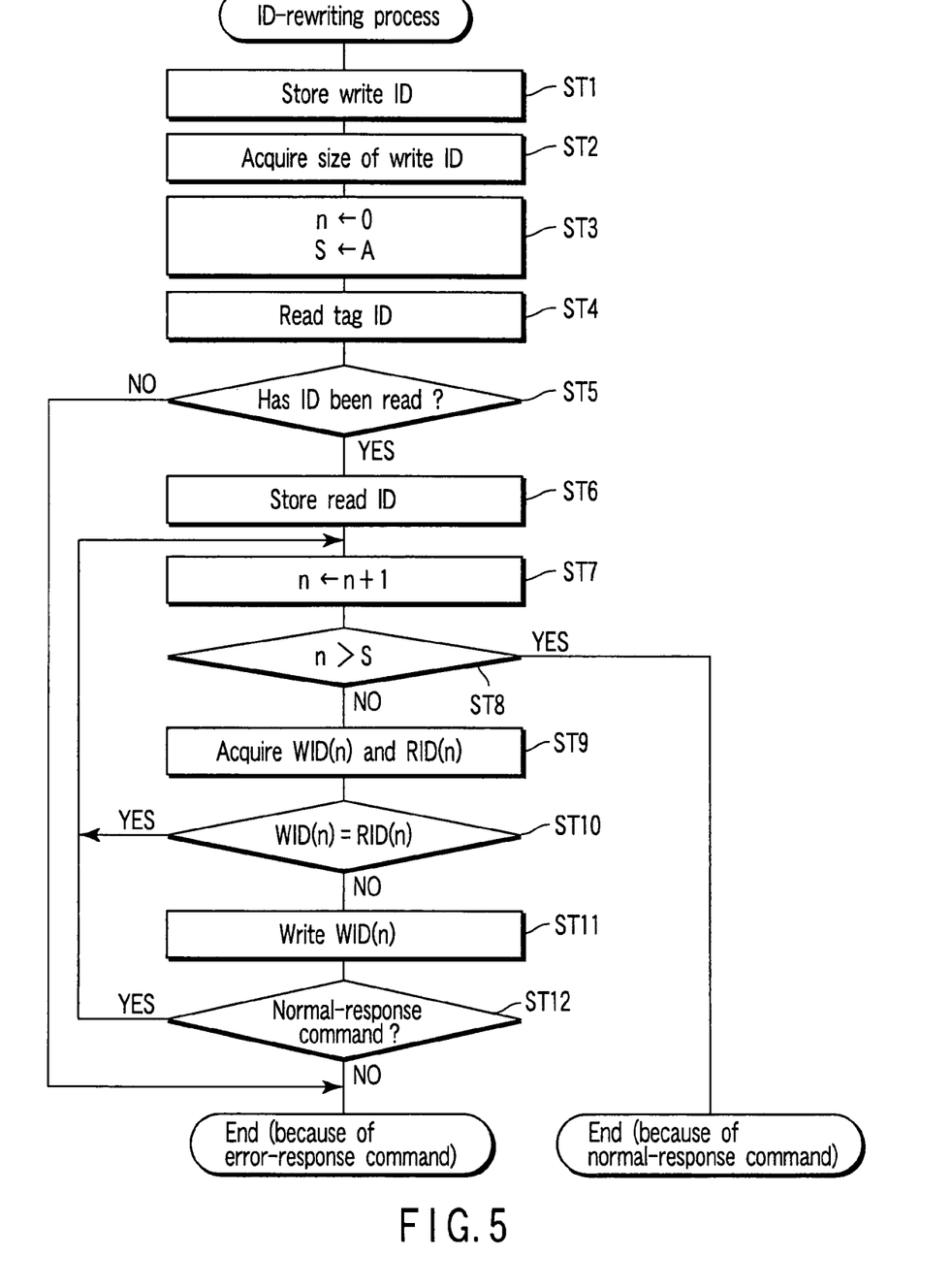
FIG. 5 is a flowchart explaining the sequence of the ID-rewriting process that the CPU of the reader-writer performs in the first embodiment.

First, the CPU 57 stores the write ID received from the host apparatus in the write-ID memory 71, in Step ST1.

Next, the CPU 57 acquires word number A in Step ST2. The word number A indicates the size of the write ID. The word number A is "7" because the ID consists of seven words in this embodiment. The CPU 57 writes the word number A (=7) to the size-data memory 73 in Step ST3. The CPU 57 also resets the count n in the word-counter memory 72 to value "0."

Subsequently, the CPU 57 writes an ID to the RFID device 2 in Step ST4. First, the CPU 57 gives an ID-inquiry signal to the modulation unit 61 of the digital modem circuit 56.

The modulation unit 61 modulates and amplifies the ID-inquiry signal, which is supplied to the antenna 11. The antenna 11 emits a radio signal corresponding to the ID-inquiry signal. At this point, the RFID device 2 can receive this radio signal, because it exists in the region to which a radio signal can propagate from the antenna 11. In the RFID device 2 that has received the radio signal representing the ID-inquiry signal, the ID stored in the memory unit 27 is modulated, generating a modulated signal. The modulated signal is emitted from the antenna 21, in the form of a radio signal.

In the reader-writer 1, the antenna 11 picks up the radio signal emitted from the RFID device 2. The demodulation unit 64 demodulates the radio signal, back into the ID. The ID is read by the CPU 57.

The CPU 57 determines in Step ST5 whether the ID has been read. The reader-writer 1 cannot read the ID if the RFID device 2 exists outside the region to which a radio signal can propagate from the antenna 11. The reader-writer 1 cannot read the ID, either, if the RFID device 2 exists in that region but is broken. In either case, a writing error occurs. The CPU 57 informs the host apparatus of the writing error and terminates the process.

If the ID of the RFID device 2 is read into the reader-writer 1, the CPU 57 stores the ID (hereinafter referred to as read ID) in the read-ID memory 74 in Step ST6. Now that the RFID device 2 has the read ID in the read-ID memory 74, the ID can be rewritten in the RFID device 2.

The CPU 57 increases the count of the word-counter memory 72 by "1" in Step ST7. The CPU 57 then determines whether the count n in the word-counter memory 72 has exceeded the value S stored in the size-data memory 73 in Step ST8. The value S stored in the memory 73 is the number A of words constituting the write ID. If the count n has exceeded the value S, the CPU 57 terminates the ID-rewriting process. If the count n has not exceeded the value S, the CPU 57 goes to Step ST9.

In Step ST9, the CPU 57 acquires the data block WID(n), i.e., the nth word of the write ID stored in the write-ID memory 71. The CPU 57 also acquires the data block RID(n), i.e., the nth word of read ID stored in the read-ID memory 74. Note that "n" is the count of the word-counter memory 72. The CPU 57 stores the data block WID(n) in the write-word buffer 75. The CPU 57 stores the data block RID(n) in the read-word buffer 76.

In Step ST10, the CPU 57 collates the one-word data block WID(n) stored in the write-word buffer 75 with the one-work data block RID(n) stored in the read-word buffer 76. If the data blocks collated are not identical to each other, the CPU 57 goes to Step ST11.

In step ST11, the CPU 57 writes the data block WID(n) to the RFID device 2, in which the ID should be rewritten.

That is, the CPU 57 generates a data-write command, which is supplied to the modulation unit 61. The data-write command is composed of a destination ID and write data. The destination ID is a read ID stored in the read-ID memory 74. The write data is the data block WID(n) stored in the write-word buffer 75.

The data-write command is modulated by the modulation unit 61 and then amplified. The command modulated and amplified is supplied to the antenna 11. The antenna 11 emits a radio signal representing the data-write command. At this time, any RFID device 2 that exists in the region to which a radio signal can propagate from the antenna 11 can receive this radio signal. However, any RFID device 2 in which the destination ID is not set in the ID area 271, cannot receive this radio signal.

The RFID device 2, in which the destination ID is set in the ID area 271, processes the write command contained of the data-write command. That is, of the IDs stored in the ID area 271, the nth data block is rewritten to write data. Thus, the data can be rewritten at a time, in units of rewritable words, in the writing process performed in accordance with one data-write command.

The RFID device 2 determines whether the data block WID(n) has been rewritten in normal way. If the data block WID(n) has been rewritten in normal way, the antenna 21 of the RFID device 2 emits a radio signal that represents a normal-response command. If the data block WID(n) has not been rewritten in normal way, the antenna 21 emits a radio signal that represents an error-response command.

The antenna 11 of the reader-writer 1 picks up the radio signal emitted from the RFID device 2. In the reader-writer 1, the demodulation unit 64 demodulates the radio signal to a command, which is supplied to the CPU 57.

The CPU 57 determines the type of response command in Step ST12. If the response command is an error-response command, the CPU 57 determines that the ID-rewriting process is an erroneous one. If the response command is a normal-response command, the CPU 57 returns to Step ST7.

In Step ST10, the data blocks collated may be found to be identical. In this case, the CPU 57 goes returns to Step ST7. That is, the CPU 57 skips the process of writing the data block WID(n).

The CPU 57 performs Steps ST8 to ST12 every time it increases the count of the word-counter memory 72 by "1." When the count n in the memory 72 exceeds the stored value S, the CPU 57 terminates the ID-rewriting process.

The CPU 57 functions as reading unit 57*a* while performing Steps ST4 to ST6. The CPU 57 functions as collating unit 57*b* while performing Steps ST7 to ST10. The CPU 57 functions as control unit 57*c* while performing Steps ST10 and ST11.

Assume that, as shown in FIG. 3, the write ID supplied to the RFID device 2 is "0006000100020003000400050006" and that the read ID supplied from the RFID device 2 is "0006000000000000000000000000."

In this case, the reader-writer 1 collates the first data block write ID with that of the read ID. That is, the data block "0006," i.e., the first word of the write ID, is collated with the data block "0006," i.e., the first word of the read ID. Since the data blocks collated are identical, the writing of the data block "0006" is skipped.

Next, the second data block "0001," i.e., the second word of the write ID, is collated with the second data block "0000," i.e., the second word of the read ID. Since these data blocks are not identical, the data block "0001" is written. That is, the second word of the ID stored in the ID area 271 of the RFID device 2, to which data should be written, is rewritten, from "0000" to "0001."

Then, the third data block "0002," i.e., the third word of the write ID, is collated with the second data block "0000," i.e., the third word of the read ID. In this case, too, the data blocks collated are not identical, the data block "0002" is written.

Thereafter, the ID of the RFID device 2 is rewritten, word by word, in non-contact fashion. More precisely, the fourth word "0000" is rewritten to "0003," the fifth word "0000" to "0004," the sixth word "0000" to "0005," and the seven word "0000" to "0006."

Thus, the seven-word ID "0006000000000000000000000000" stored in RFID device 2 is rewritten to "0006000100020003000400050006" by repeating the data-block rewriting process six times in total.

Hitherto, one-word block writing must be repeated seven times in order to rewrite a seven-word ID. In the first embodiment of this invention, one-word block writing is repeated only six times to rewrite a seven-word ID. The time required for the ID-rewriting process can therefore be shortened.

While the reader-writer 1 is rewriting the ID, the transponder-supplying unit 12 keeps moving the RFID device 2, to which data should be written, downwards with respect to the antenna 11. The RFID device 2 may inevitably go outside the region.

Assume that the RFID device 2 goes out of that region immediately after the sixth word, i.e., data block "0005," has been written to the RFID device 2 in which data should be rewritten. Then, the seventh word, i.e., data block "0006" is not written. Consequently, the ID-rewriting process becomes erroneous.

When the ID-rewriting process becomes erroneous, the RFID device 2 is moved back into the region to which a radio signal can propagate from the antenna 11. Then, the ID-rewriting process is performed again from beginning. That is, it is tried again to detect the RFID device 2.

If the RFID device 2 is detected again, the writing of the first to sixth words is skipped because the first to sixth words the write ID are all identical to the first to the sixth words of the read ID. Hence, the reader-writer 1 needs to write one word only, i.e., the seventh word. That is, the reader-writer 1 rewrites the ID of the RFID device 2 to "0006000100020003000400050006."

The step of writing the same data as the data stored in the RFID device 2 can thus be skipped in the first embodiment. The data-writing process can be performed at high speed. In other words, the data-writing process can be performed within a short time. As a result, the rate of writing error can be reduced even if the reader-writer 1 is of the type that moves the RFID device 2 downwards with respect to the antenna 11.

The reader-writer 1 according to the first embodiment skips the process of writing any data block of the ID to be written to the RFID device 2, which is identical to the corresponding data blocks of the ID already stored in the RFID device 2. The RFID device 2 is detected every time before the reader-writer 1 writes data to the RFID device 2 in non-contact fashion. To detect the RFID device 2, it is absolutely necessary to read the ID of the RFID device 2. In the first embodiment, this absolutely necessary process step is effectively utilized. No additional steps dedicated to the reading of the ID from the RFID device 2 are added. This greatly helps to shorten time required for the ID-rewriting process.

Second Embodiment

In the first embodiment, the write ID and the read ID are collated with each other, word by word. When any word of the write ID is found different from the corresponding word of the read ID, the data block for the word is written. The timing of writing the data block is not limited to this, nevertheless. A second embodiment of the present invention, in which data block is written at different timing will be described, with reference to FIGS. 6 and 7.

Figure 6:
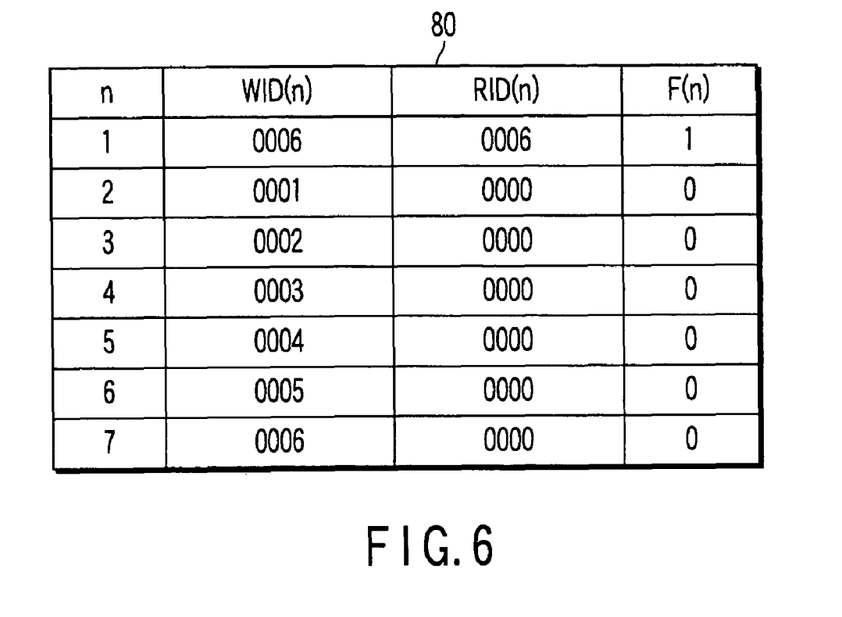
FIG. 6 illustrates the a data-block division table that is stored in the RAM of the reader-writer according to a second embodiment of the present invention.
Figure 7:
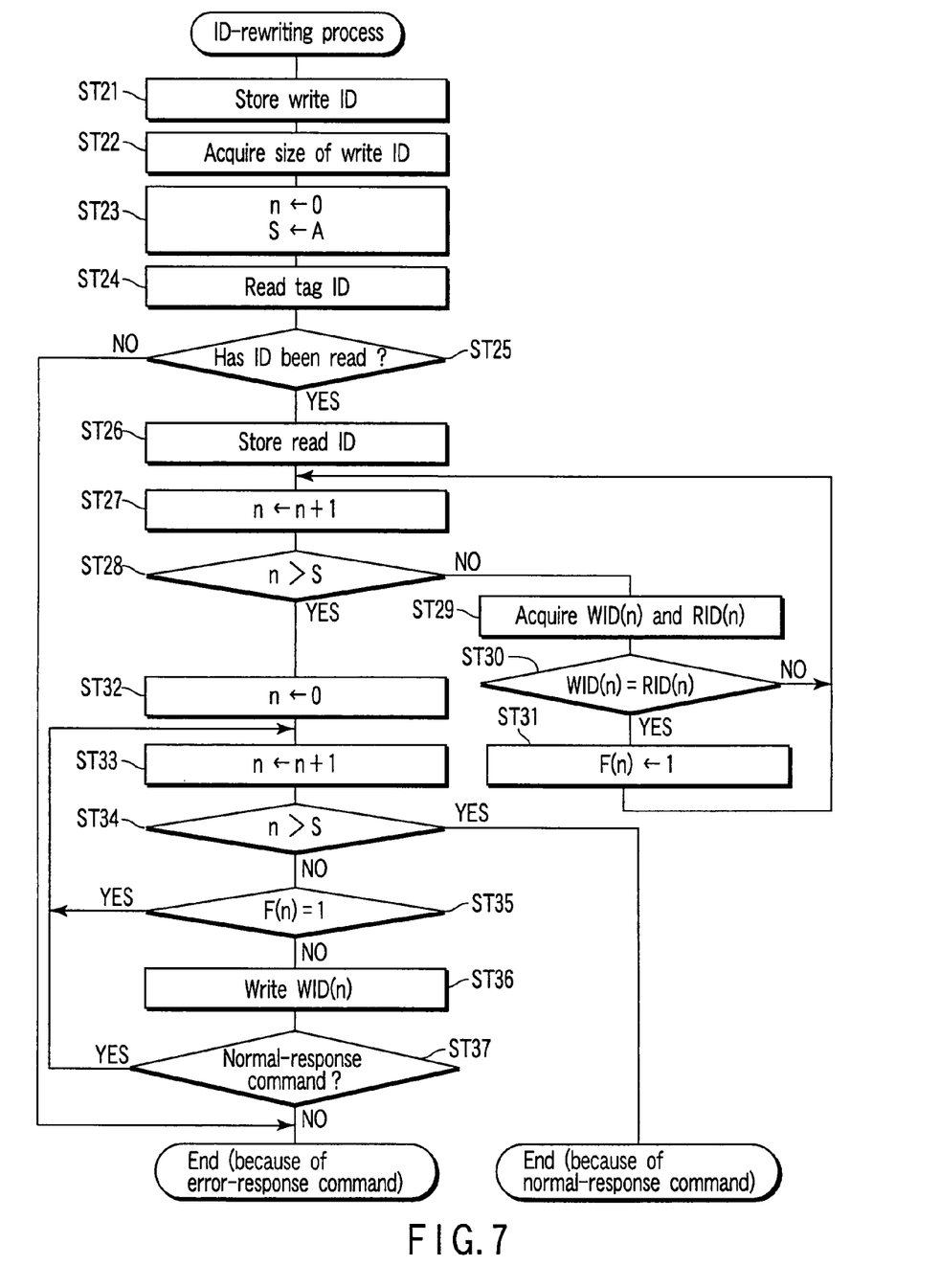
FIG. 7 is a flowchart explaining the sequence of ID-rewriting process that the CPU of the reader-writer performs in the second embodiment.

In the second embodiment, the write ID and the read ID are first collated, word by word. After the write ID and the read ID have been collated, only those data blocks that should be written to the RFID device 2, which are found different, are written.

In the second embodiment, too, the data block that can be written to the RFID device 2 through a single writing step is one word, and ID of the RFID device 2 is a seven-word data.

In the second embodiment, the RAM 53 stores such a data-block division table 80 as shown in FIG. 6. Neither the write-word buffer 75 nor the read-word buffer 76 are necessary. The data-block division table 80 can record a one-word data block WID(n) and a one-word data block RID(n) in association, for each of the serial table numbers n. Coincidence flags F(n) are stored in the memory areas for the respective data blocks.

On receiving an ID-write command from the host apparatus via the communication interface 51, the CPU 57 activates the ID-writing program. Once having activated this program, the CPU 57 initializes the data-block division table 80. As the table 80 is initialized, the data block WID(n) and the data block RID(n) are cleared and the coincidence flags F(n) are reset to "0."

After initializing the data-block division table 80, the CPU 57 performs the ID-rewriting process as shown in the flowchart of FIG. 7.

First, the CPU 57 writes the write ID received from the host apparatus to the write-ID memory 71, in Step ST21.

The CPU 57 then acquires word number A in Step ST22. The word number A indicates the size of the write ID. The word number A is "7" because the ID consists of seven words in this embodiment. The CPU 57 writes the word number A (=7) to the size-data memory 73 in Step ST23. The CPU 57 also resets the count n in the word-counter memory 72 to value "0."

Next, the CPU 57 reads the ID of the RFID device 2 in Step ST24. The CPU 57 determines in Step ST25 whether the ID has been successfully read from the RFID device 2. If the ID has been read, the CPU 57 stores this ID in the read-ID memory 74 in Step ST26. The RFID device 2 that has the ID thus read becomes an RFID device in which the ID should be rewritten.

The CPU 57 increases the count of the word-counter memory 72 by "1" in Step ST27. The CPU 57 then determines whether the count n in the word-counter memory 72 has exceeded the value S stored in the size-data memory 73 in Step ST28. The value S stored in the memory 73 is the number A of words constituting the write ID. If the count n has exceeded the value S, the CPU 57 terminates the ID-rewriting process. If the count n has not exceeded the value S, the CPU 57 goes to Step ST29.

In Step ST29, the CPU 57 acquires the data block WID(n), i.e., the nth word of the write ID stored in the write-ID memory 71. The CPU 57 also acquires the data block RID(n), i.e., the nth word of read ID stored in the read-ID memory 74. Note that "n" is the count of the word-counter memory 72. The CPU 57 stores the data block WID(n) and the data block RID(n), thus acquired, in association in the area for the table-number n in the data-block division table 80.

In Step ST30, the CPU 57 collates the data blocks WID(n) and RID(n), both stored in the area for the table-number n. If the data blocks collated are identical, the CPU 57 goes to Step ST31. That is, the CPU 57 sets the coincidence flag F(n), which corresponds to the table-number n in the data-block division table 80, to "1." If the data blocks collated are not identical, the CPU 57 skips Step ST31. Hence, the coincidence flag F(n) for the table-number n in the data-block division table 80 remains "0." The CPU 57 then goes to Step ST27.

The CPU 57 performs Steps ST28 to ST31 every time it increases the count of the word-counter memory 72 by "1." When the count n in the memory 72 exceeds the stored value S, the CPU 57 resets the count n in the word-counter memory 72 to "0."

Next, the CPU 58 increases the count n in the word-counter memory 72 by "1" in Step ST33. In Step ST34, the CPU 57 determines whether the count n in the word-counter memory 72 has exceeded the value S stored in the size-data memory 73. If the count n has not exceeded the value S, the CPU 57 goes to Step ST35.

In Step ST35, the CPU 57 checks the coincidence flag F(n) for the table-number n in the data-block division table 80. If this coincidence flag F(n) is "0," the data block WID(n) and the data block RID(n) are not identical to each other. In this case, the CPU 57 writes the data block WID(n) in Step ST36.

That is, the CPU 57 generates a data-write command, which is supplied to the modulation unit 61. The data-write command is composed of a destination ID and write data. The destination ID is a read ID stored in the read-ID memory 74. The write data is the data block WID(n) stored in the table number n of the data-block division table 80.

The data-write command is modulated by the modulation unit 61 and then amplified. The command modulated and amplified is supplied to the antenna 11. The antenna 11 emits a radio signal representing the data-write command. At this time, any RFID device 2 that exists in the region to which a radio signal can propagate from the antenna 11 can receive this radio signal. However, any RFID device 2 that has a destination ID for the data-write command is not set in the ID area 271 of the memory 27 cannot receive this radio signal.

The RFID device 2, in which the destination ID is set in the ID area 271, processes the write command contained of the data-write command. That is, of the IDs stored in the ID area 271, the nth data block is rewritten into write data. Thus, the data can be rewritten at a time, in units of rewritable words, in the writing process performed in accordance with one data-write command.

The RFID device 2 determines whether the data block WID(n) has been rewritten in normal way. If the data block WID(n) has been rewritten in normal way, the antenna 21 of the RFID device 2 emits a radio signal that represents a normal-response command. If the data block WID(n) has not been rewritten in normal way, the antenna 21 emits a radio signal that represents an error-response command.

The antenna 11 of the reader-writer 1 picks up the radio signal emitted from the RFID device 2. In the reader-writer 1, the demodulation unit 64 demodulates the radio signal to a command, which is supplied to the CPU 57.

The CPU 57 determines the type of response command in Step ST37. If the response command is an error-response command, the CPU 57 determines that the ID-rewriting process is an erroneous one. If the response command is a normal-response command, the CPU 57 returns to Step ST33.

In Step ST35, the coincidence flag F(n) may be found to be "1." If this is the case, the data block WID(n) and the data block RID(n) are identical, and the CPU 57 goes to Step S33. That is, the CPU 57 skips the process of writing the data block WID(n).

The CPU 57 performs Steps ST34 to ST37 every time it increases the count of the word-counter memory 72 by "1." When the count n in the memory 72 exceeds the stored value S, the CPU 57 terminates the ID-rewriting process.

In the second embodiment, too, the process of writing the same data as stored in the RFID device 2 can be skipped. The second embodiment can therefore achieve the same advantage as the first embodiment.

Third Embodiment

In the first and second embodiments, the write ID and the read ID are collated, word by word. There have been developed various types of RFID devices recently. To the RFID devices of some types, a data block consisting of two or more words can be written at a time if the each word is two-byte data. A third embodiment of the invention, which can write a plurality of words to an RFID device at a time, will be described with reference to FIGS. 8 and 9.

In the third embodiment, a data block is written at the same timing as done by the reader-writer according to the first embodiment.

Figure 8:
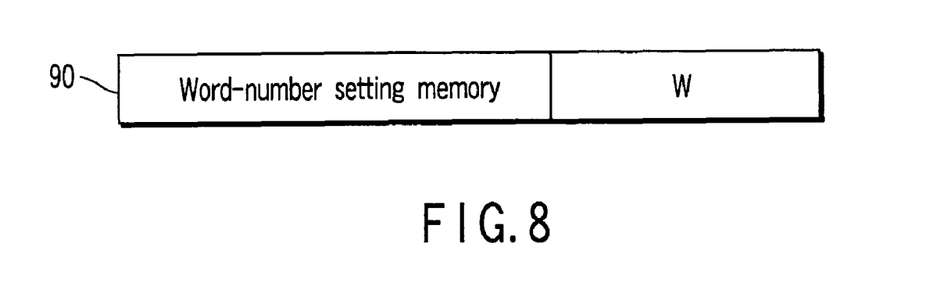
FIG. 8 is a diagram showing the word-number setting memory provided in the RAM of the reader-writer according to a third embodiment of this invention.

A word-number setting memory 90 shown in FIG. 8 is provided in the RAM 53 in the third embodiment. The word-number setting memory 90 stores a word-number w that represents the number of data blocks that can be written to a RFID device 2 at a time. The minimum value for the word-number w is "2." The maximum is the largest number of words that can be written at a time. The user may set, in the word-number setting memory 90, any desired word-number that ranges from the minimum value to the maximum value.

On receiving an ID-write command from the host apparatus via the communication interface 51, the CPU 57 activates the ID-writing program. Once having activated this program, the CPU 57 performs the ID-rewriting process in the sequence shown in the flowchart of FIG. 9.

Figure 9:
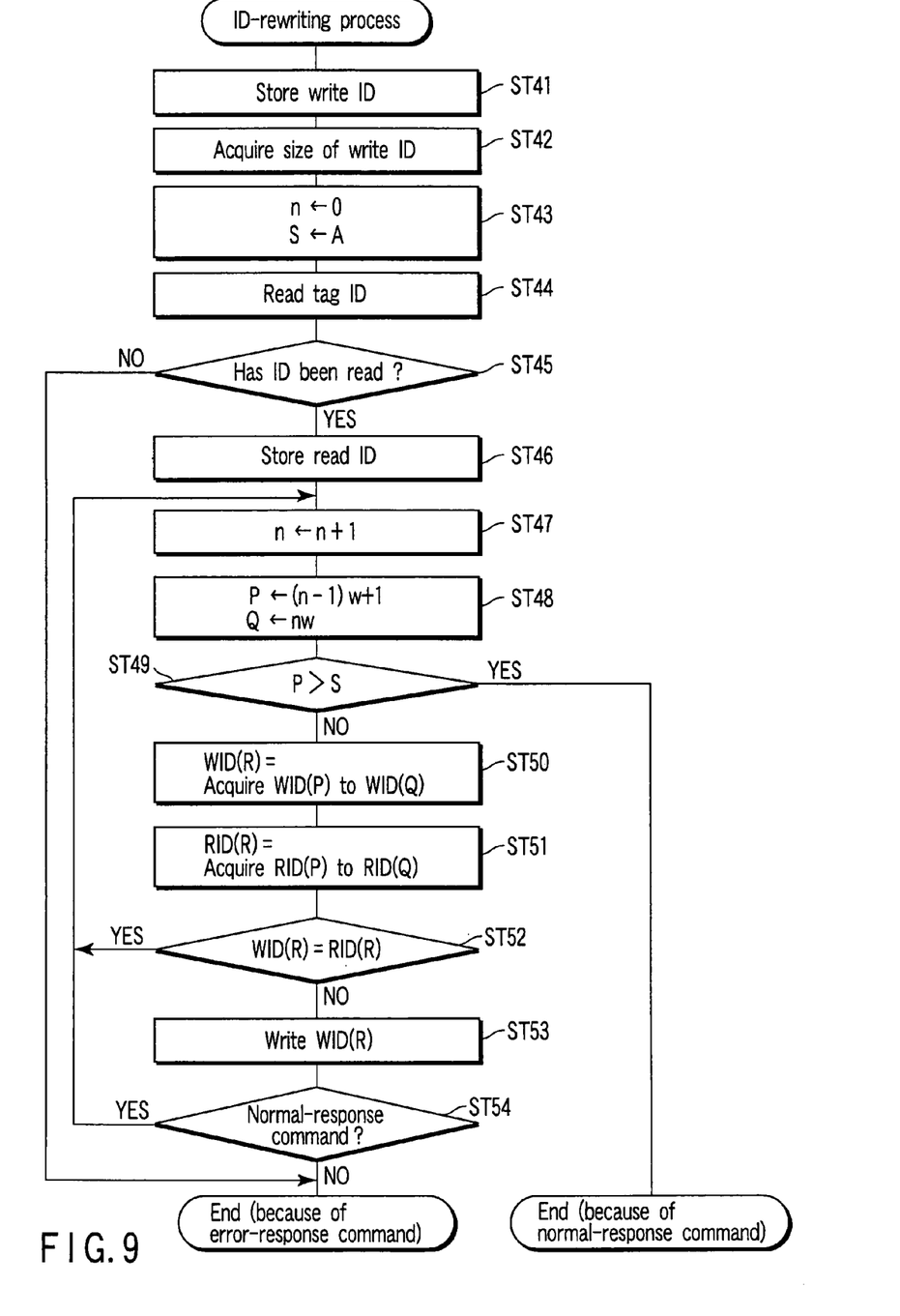
FIG. 9 is a flowchart showing the sequence of major steps of the ID-rewriting process that the CPU of the reader-writer according to the third embodiment performs.

First, the CPU 57 writes the write ID received from the host apparatus to the write-ID memory 71, in Step ST41.

Next, the CPU 57 acquires word number A in Step ST42. The word number A indicates the size of the write ID. The word number A is "7" because the ID consists of seven words in this embodiment. The CPU 57 writes the word number A (=7) to the size-data memory 73 in Step ST43. The CPU 57 also resets the count n in the word-counter memory 72 to value "0."

Subsequently, the CPU 57 reads the ID of the RFID device 2 in Step ST44. The CPU 57 determines in Step ST45 whether the ID has been successfully read from the RFID device 2. If the reader-writer 1 has read the ID of the RFID device 2, the CPU 57 stores this ID in the read-ID memory 74 in Step ST46. The CPU 57 then recognizes the RFID device 2 having this ID as an RFID device in which the ID should be rewritten.

The CPU 57 increases the count of the word-counter memory 72 by "1" in Step ST47. In Step ST48, the CPU 57 then calculates values P and Q (P<Q), using the following equations (1) and (2).

$$P=(n-1)w+1 \qquad (1)$$

$$Q=nw \qquad (2)$$

where n is the count of the word-counter memory 72, and w is the word-number set in the word-number setting memory 90.

The CPU 57 determines whether the value P calculated in accordance with the equation (1) has exceeded the value S stored in the size-data memory 73 in Step ST49. The value S stored in the memory 73 is the number A of words constituting the write ID. If the count P has exceeded the value S, the CPU 57 terminates the ID-rewriting process. If the count P has not exceeded the value S, the CPU 57 goes to Step ST50.

In Step ST50, the CPU 57 acquires the Pth word to the Qth word of the write ID stored in the write-ID memory 71. That is, the CPU 57 acquires data block WID(P) to data block WID(Q). The data blocks, from the block WID(P) to the block WID(Q), will be referred to as data-block group WID(R). The CPU 57 stores the data-block group WID(R) in the write-word buffer 75.

In Step ST51, the CPU 57 acquires the Pth word to the Qth word of the read ID stored in the read-ID memory 74. That is, the CPU 57 acquires data block RID(P) to data block RID(Q). The data blocks, from the block RID(P) to the block RID(Q), will be referred to as data-block group RID(R). The CPU 57 stores the data-block group RID(R) in the read-word buffer 76.

"P" and "Q" are values calculated in accordance with the equations (1) and (2), respectively. The number of data blocks, from Pth word to the Qth word, is equal to the word-number w set in the word-number setting memory 90.

The CPU 57 collates the data-block group WID(R) stored in the write-word buffer 75 with the data-block group RID(R) stored in the read-word buffer 76 in Step ST52. If these data-block groups are not identical, the CPU 57 writes, in Step ST53, the data-block group WID(R) to the RFID device 2 in which the ID should be rewritten.

That is, the CPU 57 generates a data-write command, which is supplied to the modulation unit 61. The data-write command is composed of a destination ID and write data. The destination ID is a read ID stored in the read-ID memory 74. The write data is the data-block group WID(R) stored in the write-word buffer 75.

The data-write command is modulated by the modulation unit 61 and then amplified. The command modulated and amplified is supplied to the antenna 11. The antenna 11 emits a radio signal representing the data-write command. At this time, any RFID device 2 that exists in the region to which a radio signal can propagate from the antenna 11 can receive this radio signal. However, any RFID device 2 for which the destination ID of the data-write command is not set in the ID area 271 of the memory 27 cannot receive this radio signal.

The RFID device 2, in which the destination ID is set in the ID area 271, processes the write data contained of the data-write command. That is, of the IDs stored in the ID area 271, the Pth data block to Qth data block are rewritten to write data. Thus, the data can be rewritten at a time, in units of word-number w, in the writing process performed in accordance with one data-write command.

The RFID device 2 determines whether the data-block group WID(R) has been rewritten in normal way. If the data-block group WID(R) has been rewritten in normal way, the antenna 21 of the RFID device 2 emits a radio signal that represents a normal-response command. If the data-block group WID(R) has not been rewritten in normal way, the antenna 21 emits a radio signal that represents an error-response command.

The antenna 11 of the reader-writer 1 picks up a radio signal emitted from the RFID device 2. In the reader-writer 1, the demodulation unit 64 demodulates the radio signal to a command, which is supplied to the CPU 57.

The CPU 57 determines the type of response command in Step ST54. If the response command is an error-response command, the CPU 57 determines that the ID-rewriting process is an erroneous one. If the response command is a normal-response command, the CPU 57 returns to Step ST47.

In Step ST52, the data-block groups collated may be found to be identical to each other. In this case, the CPU 57 goes returns to Step ST47. That is, the CPU 57 skips the process of writing the data block group WID(R).

The CPU 57 performs Steps ST48 to ST54 every time it increases the count of the word-counter memory 72 by "1." When the count n in the memory 72 exceeds the calculated value P, the CPU 57 terminates the ID-rewriting process.

Assume that the write ID supplied to the RFID device 2 is "00060001000200030004000050006" and that the read ID supplied from the RFID device 2 is "00060000100000000000000000."

Also assume that the word-number w set in the word-number setting memory 90 is "2." Then, the reader-writer 1 collates the data-block group "00060001", or the first and second words of the write ID, with the data-block group "00060001," or the first and second words of the read ID. Since the data-block groups collated are identical, the writing of the data-block group "00060001" is skipped.

Next, the data-block group "00020003", or the third and fourth words of the write ID, is collated with the data-block group "00000000," or the third and fourth words of the read ID. Since the data-block groups collated are not identical, the data-block group "00020003" is written. That is, the third and fourth words of the ID stored in the ID area 271 of the RFID device 2 is rewritten, from "00000000" to "00020003."

Further, the data-block group "00040005," or the fifth and sixth words of the write ID, is collated with the data-block group "00000000," or the fifth and sixth words of the read ID. In this case, too, the data-block groups collated are not identical. The data-block group "00040005" is therefore written.

Still further, the data-block group, or the seventh and eighth words of the write ID, is collated with the data-block group, or the seventh and eighth words of the read ID. Since the IDs are seven-word data, each, the seventh word of the write ID, "0006," is collated with the seventh word of the read ID, "0000." In this case, too, the data blocks collated are not identical. The data block "0006" is therefore written.

Thus, the seven-word ID stored in the RFID device 2, i.e., "00060000100000000000000000," can be rewritten to a write ID "00060001000200030004000050006" by performing the data-block writing process four times.

In the first embodiment, the data-block writing process must be performed six times in order to rewrite the seven-word ID. In the third embodiment, it suffices to perform the process four times only. This further shortens time required for the ID-rewriting process.

Needless to say, the third embodiment will operate in the same way as the first embodiment if the word-number w is "1."

The present invention is not limited to the embodiments described above. The components of any embodiment can be modified in various manners in reducing the invention to practice, without departing from the spirit or scope of the invention.

The invention can be applied to a reader-writer that rewrites the data stored in the user area 272 of the RFID device 2, not the ID stored in the ID area 271 of the RFID device 2 as in the embodiments described above.

In the embodiments described above, the RFID device 2, to which data should be written, is kept moving downwards with respect to the antenna 11 while the reader-writer 1 is rewriting the ID. Nonetheless, the present invention can be applied to a reader-writer than can read and write data from and to RFID devices 2 that are not moved at all. Further, the invention can be applied to a reader-writer that prints data on the surfaces of the RFID device 2 at any position upstream or downstream of the antenna 11.

Further, the components of the embodiments described above may be combined, if necessary, in various ways to make different inventions. For example, some of the component of any embodiment may not be used. Moreover, the components of the different embodiments may be combined in any desired fashion.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication apparatus configured to read and write data from and to transponders, the radio communication apparatus comprising:
    a memory unit which stores data to be written to the transponders;
    a reading unit which, in response to a write command instructing that write data stored in the memory unit should be written to one of the transponders during a data-writing process, performs radio communication with the one of the transponders prior to the data-writing process, wherein the radio communication includes reading data stored in the one of the transponders in a non-contact fashion;
    a collating unit which, prior to the data-writing process, collates the data read from the one of the transponders by the reading unit with the write data,
    wherein the collating unit
        compares a first group of words in the write data to respective words in the read data, and compares a second group of words in the write data to respective words in the read data; and a control unit which performs radio communication with the one of the transponders, thereby writing the write data to the transponder when the collated data are not identical, and skipping the writing of the write data when the collated data are identical, wherein the control unit skips writing the first group of words to the one of the transponders when the first group of words matches the respective words in the read data, writes the second group of words to the one of the transponders when the second group of words does not match the respective words in the read data, receives a response signal from the one of the transponders after writing the write data to the one of the transponders, and determines whether there is an error in the one of the transponders based on the response signal, and wherein the write data is written to the one of the transponders, in units of words each consisting of a plurality of bytes; the collating unit collates the write data and the data read from the transponder by the reading unit, word by word; and the control unit determines whether the writing of the write data should be skipped, for each word.

2. The radio communication apparatus according to claim 1, wherein the control unit acquires the result of collation every time the collating unit collates the write data and the data read from the transponder by the reading unit, word by word, performs radio communication with the one of the transponders, thereby writing the data to the one of the transponders when the collated data are not identical, and skipping the writing of the write data when the collated data are identical.

3. The radio communication apparatus according to claim 1, further comprising a result-storage unit configured to store results of the collation performed word by word in the collating unit, wherein the control unit determines whether the writing of the write data should be skipped, for each word, in accordance with the results stored in the result-storage unit.

4. The radio communication apparatus according to claim 1, further comprising a word-number setting memory configured to store word-numbers, wherein the collating unit collates the write data and the data read from the one of the transponders by the reading unit, in units of word-numbers stored in the word-number setting memory, and wherein the control unit determines whether the writing of the write data should be skipped in accordance with each word-number stored in the word-number setting memory.

5. A radio communication apparatus configured to read and write data from and to transponders, the radio communication apparatus comprising:

a memory unit which stores identifications (IDs) to be rewritten to the transponders during a rewriting process;

a reading unit which, in response to a write command instructing that write data should be written to one of the transponders, performs radio communication with the one of the transponders prior to the rewriting process, wherein the radio communication includes reading a first ID stored in the one of the transponders in a non-contact fashion;

a collating unit which, prior to the rewriting process, collates the first ID with a second ID stored in the memory unit, wherein the collating unit compares a first group of words in the write data to respective words in the read data, and compares a second group of words in the write data to respective words in the read data; and a control unit, which performs radio communication with the one of the transponders in which the first ID should be rewritten including rewriting the first ID with the second ID when the collated IDs are not identical, and skipping the rewriting of the first ID when the collated IDs are identical, wherein the control unit skips writing the first group of words to the one of the transponders when the first group of words matches the respective words in the read data, writes the second group of words to the one of the transponders when the second group of words does not match the respective words in the read data, receives a response signal from the one of the transponders after writing the write data to the one of the transponders, and determines whether there is an error in the one of the transponders based on the response signal, wherein the write data is written to the one of the transponders, in units of words each consisting of a plurality of bytes, wherein the collating unit collates the first ID and the second ID, word by word, and wherein the control unit determines whether the rewriting of the first ID should be skipped, for each word.

6. The radio communication apparatus according to claim 5, wherein the control unit acquires the result of collation every time the collating unit collates IDs, word by word.

7. The radio communication apparatus according to claim 5, further comprising a result-storage unit configured to store results of the collation performed word by word in the collating unit, wherein the control unit determines whether the rewriting of the first ID should be skipped, for each word, in accordance with the results stored in the result-storage unit.

8. The radio communication apparatus according to claim 5, further comprising a word-number setting memory configured to store word-numbers, wherein the collating unit collates the first ID and the second ID, in units of word-numbers stored in the word-number setting memory, and the control unit determines whether the rewriting of the first ID should be skipped in accordance with each word-number stored in the word-number setting memory.

9. The radio communication apparatus of claim 1, wherein distances between the transponders and the reading unit are changing while the reading unit is reading the data stored in the one of the transponders and while the control unit is writing the write data to the one of the transponders.

10. The radio communication apparatus of claim 1, wherein:

each word of the data read from the transponders has a respective word in the write data;

the collating unit determines word by word whether each of the words of the data read matches each of the words in the write data; and the control unit writes a word of the write data to the transponder when the word of the write data not matching a respective one of the words in the read data.

11. The radio communication apparatus of claim 1, wherein the control unit:
   skips writing a first word of the write data to the one of the transponders when the first word matches a respective word in the read data; and
   writes a second word of the write data to the one of the transponders when the second words does not match a respective word in the read data.

12. A radio communication method of reading and writing data from and to transponders, the radio communication method comprising:
   storing in a memory unit data to be written to the transponders;
   performing, in response to a write command instructing that write data stored in the memory unit should be written to one of the transponders during a data-writing process, radio communication with the one of the transponders prior to the data-writing process, wherein the radio communication is performed via a reading unit and includes reading data stored in the one of the transponders in a non-contact fashion;
   collating, prior to the data-writing process, the data read from the one of the transponders by the reading unit with the write data via a collating unit; and
   wherein the collating comprises
      comparing a first group of words in the write data to respective words in the read data,
      comparing a second group of words in the write data to respective words in the read data, and
      collating the write data and the data read from the one of the transponders by the reading unit via the collating unit, word by word;
   performing radio communication with the one of the transponders to which the write data should be written via a control unit, thereby writing the write data to the one of the transponders when the collated data are not identical, and skipping the writing of the write data when the collated data are identical;
   determining whether the writing of the write data should be skipped for each word via the control unit;
   skipping writing the first group of words to the one of the transponders when the first group of words matches the respective words in the read data,
   writing the second group of words to the one of the transponders when the second group of words does not match the respective words in the read data,
   receiving a response signal by the control unit from the one of the transponders after writing the write data to the one of the transponders; and
   determining whether there is an error in the one of the transponders based on the response signal,
   wherein the write data is written to the one of the transponders, in units of words each consisting of a plurality of bytes.

* * * * *